United States Patent [19]
Nishimura et al.

[11] Patent Number: 5,965,296
[45] Date of Patent: Oct. 12, 1999

[54] NONAQUEOUS SECONDARY BATTERY AND A METHOD OF MANUFACTURING A NEGATIVE ELECTRODE ACTIVE MATERIAL

[75] Inventors: Naoto Nishimura; Kazuo Yamada, both of Kitakatsuragi-gun; Yoshihiro Tsukuda, Osaka; Takehito Mitate, Yamatotakada; Kazuaki Minato, Osaka, all of Japan

[73] Assignee: Sharp Kabushiki Kaisha, Osaka, Japan

[21] Appl. No.: 08/862,677

[22] Filed: May 23, 1997

[30] Foreign Application Priority Data

May 23, 1996 [JP] Japan ................................ 8-128758
Oct. 9, 1996 [JP] Japan ................................ 8-268074
Jan. 30, 1997 [JP] Japan ................................ 9-016973

[51] Int. Cl.$^6$ ........................................................ H01M 4/38
[52] U.S. Cl. ........................ 429/231.8; 429/232; 427/122; 427/314
[58] Field of Search .............................. 429/197, 218, 429/232, 231.8; 427/122, 314

[56] References Cited

U.S. PATENT DOCUMENTS

| | | | |
|---|---|---|---|
| 4,136,213 | 1/1979 | Fung et al. | 427/122 |
| 4,584,252 | 4/1986 | Touzain et al. | 429/218 X |
| 4,740,433 | 4/1988 | Lu | 429/197 |
| 5,344,726 | 9/1994 | Tanaka et al. | 429/218 X |
| 5,776,610 | 7/1998 | Yamada et al. | 429/232 X |
| 5,776,633 | 7/1998 | Mrotek et al. | 429/218 |

FOREIGN PATENT DOCUMENTS

| | | |
|---|---|---|
| 0 508 689 | 10/1992 | European Pat. Off. . |
| 0 573 266 | 12/1993 | European Pat. Off. . |
| 04115457 | 4/1992 | Japan . |
| 04115458 | 4/1992 | Japan . |
| 04237971 | 8/1992 | Japan . |
| 4-368778 | 12/1992 | Japan . |
| 05028996 | 2/1993 | Japan . |
| 05114421 | 5/1993 | Japan . |
| 5-121066 | 5/1993 | Japan . |
| 6-84516 | 3/1994 | Japan . |

OTHER PUBLICATIONS

Journal of the Electrochemical Society, "Studies of Lithium Intercalation into Carbons Using Nonaqueous Electrochemical Cells," vol. 137, pp. 2009–2023, Fong et al., Jul., 1990.
Journal of the Electrochemical Society, "The Study of Li–Graphite Intercalation Processes in Several Electrolyte Systems Using In Situ X–Ray Diffraction," vol. 142, pp. 1746–1752, Aurbach et al., Jun., 1995.
Patent Abstracts of Japan, vol. 18, No. 221 (E–1540) Apr. 20, 1994 & JP 06 020690.

*Primary Examiner*—Stephen Kalafut
*Attorney, Agent, or Firm*—Nixon & Vanderhye P.C.

[57] ABSTRACT

A nonaqueous secondary battery comprising a negative electrode, a positive electrode in which a chalcogenated substance containing lithium is used as a positive electrode active material and a nonaqueous ion conductor, said negative electrode containing a negative electrode active material which is a carbon material where an amorphous carbon is adhered on the surface of graphite particles which are subjected to an oxidizing treatment.

22 Claims, 3 Drawing Sheets

NONAQUEOUS SECONDARY BATTERY AND A METHOD OF MANUFACTURING A NEGATIVE ELECTRODE ACTIVE MATERIAL

BACKGROUND OF THE INVENTION

1. Field of the Invention

The present invention relates to a nonaqueous secondary battery and to a method of manufacturing a negative electrode active material. More particularly, it relates to a nonaqueous secondary battery where graphite particles in which intercalation and deintercalation of lithium are possible are used in a negative electrode and also to a method of manufacturing a negative electrode active material.

2. Related Arts

With the trends of making the size, the weight and the electric consumption of electronic instruments and the like smaller, lighter and less, respectively, secondary batteries using an alkali metal such as lithium have been attracting public attention. However, when lithium metal alone is used in a negative electrode of the battery, there is a problem that, as a result of repeated charges and discharges (i.e. repeated depositions and dissolutions of lithium metal), dendrites (crystals in a shape of branches of a tree) are generated on the surface of the metal and, as they grow up, they penetrate through a separator of the battery and contact the positive electrode whereby a short circuit is induced in the inner part of the battery. It has been known that, when a lithium alloy is used as a negative electrode of the second battery instead of a lithium metal, formation of the dendrite is prevented as compared with the case of the use of a lithium metal alone and the characteristics of the charge-discharge cycle are improved. However, even the use of the alloy is not effective in perfectly preventing the formation of the dendrite but a considerable possibility of a short circuit in the inner part of the battery still remains. In addition, the use of the alloyed negative electrode causes an increase in the weight whereby an advantage of the light weight of the secondary batteries by the use of lithium is deteriorated.

In recent years, there has been a development on the matrix materials such as electroconductive polymers and carbon materials utilizing the absorption-desorption steps of lithium ion instead of utilization of lithium metal or alloy thereof for negative electrode. As a result thereof, formation of dendrites which occurred when lithium metal or alloy thereof is utilized does not take place on a principal basis whereby a problem of short circuit in the inner part of batteries has been greatly reduced. It has been especially known that the absorption-desorption potential of the carbon materials is nearer the deposition-dissolution potential of lithium than other materials. Among them, a graphite material is theoretically capable of incorporating one lithium atom per six carbon atoms into its crystal lattice and, therefore, it is a carbon material having a high capacity per unit weight and unit volume. In addition, its intercalation-deintercalation potential of lithium is flat or uniform and it is a chemically stable material and, accordingly, it greatly contributes to the cycle stability of the battery.

Examples are the use of the carbon material of a graphite type as an active material for the negative electrode as disclosed in J. Electrochem. Soc., Vol. 137, 2009 (1990) and the Laid-Open Japanese Patent Laid-Open Nos. 4(1992)-115,457, 4(1992)-115,458, 4(1992)-237,971, etc. and also the use of surface-processed carbon material of a graphite type as an active material for the negative electrode as disclosed in the Japanese Patent Laid-Open Nos. 4(1992)-368,778, 5(1993)-28,996 and 5(1993)-114,421.

As mentioned above, the material of a graphite type affords a discharge capacity which is nearly the same as the theoretical capacity in an organic electrolytic solution mainly consisting of ethylene carbonate (EC). In addition, its potential in a charge—discharge cycle is slightly higher than the potential in a dissolution—deposition of lithium and is very uniform whereby, when a battery which is prepared using the carbon material of a graphite type is used as an active material for the negative electrode, the battery having a high capacity and also a highly uniform battery voltage can be materialized.

Although the carbon material can achieve a high capacity as mentioned above, there is still a problem that, due to its high crystallinity, it causes a decomposition of an electrolytic solution (a nonaqueous ionic conductor). For example, propylene carbonate (PC) which is one of the solvents for organic electrolytic solutions has been widely used as a solvent for the electrolytic solution for lithium batteries because of its wide potential range, low freezing point ($-48.8°$ C.) and high chemical stability. However, it was reported in J. Electrochem. Soc., Vol. 142, 1746 (1995) that, when the carbon material of a graphite type is used as a negative electrode active material, the negative electrode consisting of a carbon material of a graphite type is not capable of being charged and discharged in case PC of as little as 10% is present in the electrolytic solution.

It has been widely known that a carbon material of a graphite type can be used as a negative electrode for lithium secondary batteries only when an electrolytic solution of a mixed solvent type consisting of an EC and a solvent having a low viscosity is used. However, an electrolytic solution mainly comprising an EC has a low ionic conductivity at low temperatures and, when a secondary battery using said electrolytic solution and a carbon material of a graphite type as a negative electrode is prepared, it is very difficult to improve the temperature characteristics or the current characteristics of said battery by means of selection of the electrolytic solutions because the choices for the solvents which can be used for secondary batteries are very little.

In order to solve such problems, the use of carbon materials wherein the surface of graphite particles are coated with a low crystalline carbon as negative electrode active materials for secondary batteries has been proposed as mentioned, for example, in the Japanese Patent Laid-Open Nos. 4(1992)-368,778 and 5(1993)-121,066. That is an effective means for inhibiting the decomposition of the electrolytic solution to increase the discharging capacity and to improve the cycle characteristics. However, when a secondary battery is prepared using an electrolytic solution mainly comprising a PC, there are problems that, as a result of pulverization for making the particle size uniform during the manufacturing stage of its negative electrode or as a result of kneading upon manufacture of the electrode materials and of coating onto a power collecting plate, the lowly crystalline carbon coated on the graphite particle surface is peeled off whereby the electrode is destroyed by generation of gas due to decomposition of the electrolytic solution resulting in a decrease in a capacity of the battery and a deterioration of the cycle characteristics. In addition, further steps such as pulverization are necessary whereby there is another problem that the manufacturing cost is high even if a graphite material with a low price is used.

As a method where far lower manufacturing cost can be expected, there is a method in which a carbon precursor such as pitch is mixed with the graphite followed by calcinating as disclosed in the Japanese Patent Laid-Open No. 6(1994)-84,516. However, there is a problem in this method that, because the liquid-phase steps are used, the graphite particles coated with a lowly crystalline carbon adhere each other and active surfaces of the graphite appear again by a pulverization in the manufacturing steps of the negative electrode whereby decomposition of the PC takes place.

As mentioned hereinabove, a problem has now been found that, when the surface of the graphite particles are coated with a low crystalline carbon, the adhesive strength of the graphite particles with the low crystalline carbon is weak resulting in an immediate peeling off whereby decomposition of the electrolytic solution is resulted. Accordingly, there is a problem even by such a method that the characteristic properties of the battery are deteriorated and the yield in the manufacture of batteries is lowered.

SUMMARY OF THE INVENTION

In order to solve the above-mentioned problems, the present inventors have conducted an intensive study and, as a result, they have found that, when graphite particles are oxidized prior to adhering the amorphous carbon on the surface of the graphite particles, the amorphous carbon can be adhered more strongly whereupon the present invention has been achieved. It has been also found that, as a result of oxidation of the graphite particles, the amorphous carbon can be quickly sedimented in adhering the amorphous carbon to the surface of the graphite particles by means of a gas-phase pyrolytic deposition method.

Thus, the present invention provides a nonaqueous secondary battery comprising a negative electrode, a positive electrode in which a chalcogenated substance containing lithium is used as a positive electrode active material and a nonaqueous ion conductor, said negative electrode containing a negative electrode active material which is a carbon material where an amorphous carbon is adhered on the surface of graphite particles which are subjected to an oxidizing treatment.

The present invention further provides a method of manufacturing a negative electrode active material comprising the steps of: oxidizing the graphite particles and; adhering an amorphous carbon on the surface of graphite particles to form a negative electrode active material.

DESCRIPTION OF THE PREFERRED EMBODIMENTS

Figure 1:
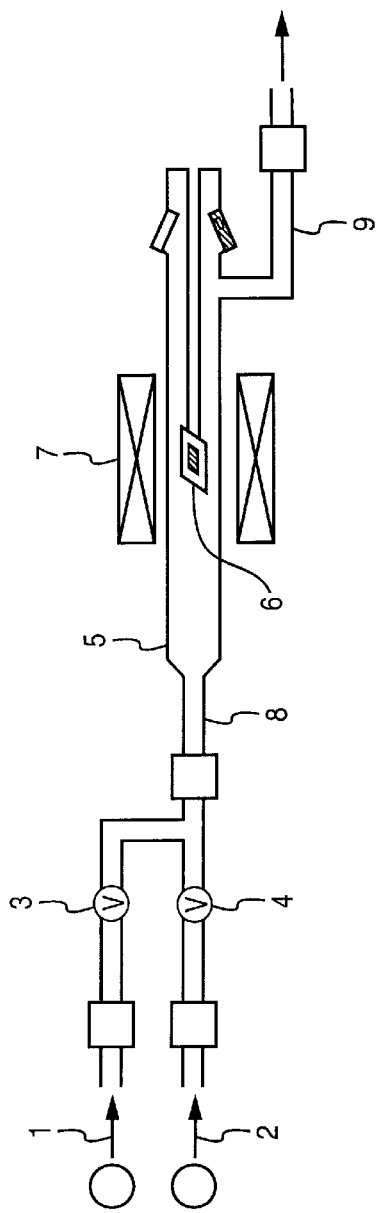
FIG. 1 is a schematic diagram illustrating an apparatus for manufacturing the amorphous carbon of the present invention.

It is preferred that the graphite particles used in the present invention are capable of intercalating and deintercalating the lithium. Examples of the graphite particles are natural graphite, artificial graphite and expanded graphite.

More preferred graphite particles are those in which the average lattice spacing ($d_{002}$) of the plane (002) by an X-ray wide angle diffraction before the oxidizing treatment is 0.335–0.340 nm, the crystallite thickness (Lc) in the direction of the plane (002) is not less than 10 nm and the crystallite thickness (La) in the direction of the plane (110) is not less than 10 nm and/or those in which the ratio of the peak intensities at 1360 $cm^{-1}$ to 1580 $cm^{-1}$ by a Raman scattering using an argon laser before the oxidizing treatment is not more than 0.4 and said intensity ratio posterior to the adhesion of the amorphous carbon is not less than 0.4.

When the $d_{002}$ of the graphite particles prior to the oxidizing treatment is more than 340 nm, both Lc and La are less than 10 nm and the ratio of the peak intensities of 1360 $cm^{-1}$ to 1580 $cm^{-1}$ is more than 0.4. This is not preferred because the crystallinity becomes low and the particles are unable to achieve the high capacity as the negative electrode active material.

It is preferred that the specific surface area of the graphite particles before the oxidizing treatment as measured by a BET method is 5–150 $m^2/g$ and the average particle size is 0.7–80 $\mu m$. Parameters outside the above range are not preferred because, when the specific surface area of the graphite particles is less than 5 $m^2/g$, the contacting area with the nonaqueous ionic conductor becomes small and the current characteristics of the electrode become low while, when it is more than 150 $m^2/g$, the contacting area with the nonaqueous ionic conductor becomes too large and the self discharge becomes big as well. When the average particle size of the graphite particles is smaller than 0.7 $\mu m$, there is a big possibility that the graphite particles permeate through the pores of the separator of the battery resulting in an internal short circuit while, when it is more than 80 $\mu m$, handling in the steps for manufacturing the electrode becomes bad. Thus, they are not preferred too. More preferred average particle size is 3–50 $\mu m$.

Then, in the present invention, the graphite particles are subjected to an oxidizing treatment before adhering the amorphous carbon to the surface of the graphite particles. As a result of subjecting the graphite particles to the oxidizing treatment, it is considered that functional groups containing oxygen may be formed on the surface and the amorphous carbon may be chemically bonded via said functional groups whereby the graphite particles and the amorphous carbon are more tightly adhered. It is also likely that, when the graphite particles are oxidized, the surface becomes physically rough whereby the adhesive strength of the amorphous carbon to the surface is increased.

Examples of such an oxidizing treatment are a method where the graphite particles are oxidized in air or in an atmosphere of oxidizing gas such as oxygen, carbon dioxide and aqueous vapor; a method where they are oxidized in a solution of an inorganic acid (e.g., nitric acid, sulfuric acid, hydrochloric acid or hydrofluoric acid), an organic acid (e.g., formic acid, acetic acid, propionic acid or phenol) or an oxidizing agent (e.g., potassium permanganate or hydrogen peroxide); and a method where they are oxidized by a thermal treatment in an aqueous alkali solution of potassium hydroxide, sodium hydroxide or lithium hydroxide, or with a solid of such alkali salt, although the present invention is not limited thereto.

When the oxidizing treatment with air is used, the oxidizing temperature is preferably 200–700° C., more preferably 500–700° C. The temperature range outside the above is not preferred because, when the oxidizing temperature is lower than 200° C., the oxidation time becomes longer resulting in a high production cost while, when it is higher than 700° C., combustion of the graphite may take place. In case where the atmosphere of oxidizing gas is used, the above condition shall be properly modified.

In the case of an oxidation using nitric acid as the representative inorganic acid, the preferred oxidizing temperature is 20–130° C. The temperature range outside that is not preferred because, when it is lower than 20° C., the graphite particles are not oxidized while, when it is higher than 130° C., there is a decrease in the safety because it is higher than the boiling point of nitric acid. Preferred concentration of nitric acid is 5–99% by weight. The concentration range outside that is not preferred because, when the concentration is lower than 5% by weight, the time for oxidation is long resulting in a high production cost. Concentration of the commercially-available fuming nitric acid is 99% by weight and it is difficult to obtain the nitric acid having the higher concentration than said concentration whereby that is not preferred. Preferred time for the oxidation is not longer than 20 hours but the present invention is not limited thereto. When other inorganic acids or organic acids are used, appropriate conditions shall be selected taking due consideration of the above conditions.

When the oxidation is conducted using the alkali solution or the alkali fused salt, it is preferred that a heating treatment is conducted by mixing an alkali salt in solid state with the graphite particles, or the graphite particles are dispersed in the alkali solution, dried and then subjected to a heating treatment although the present invention is not limited thereto. Preferred temperature for the heating treatment is near the melting point of the alkali and, preferably, it is 300–700° C. The temperature range outside that is not preferred because, when the temperature is lower than 300° C., the alkali does not melt while, when it is higher than 700° C., the chamber for the heating treatment is significantly corroded.

In the case where an oxidizing treatment is conducted using potassium permanganate, it is preferred that potassium permanganate is used in the form of an aqueous solution having a concentration of 0.01–1 mole/liter. Incidentally, when the concentration of potassium permanganate is too low, it is necessary to oxidize at high temperature or for long time. That is not preferred because the high temperature makes the manufacturing steps troublesome while an oxidation for a long time makes the production cost high. On the other hand, too high concentration of potassium permanganate is not preferred because, after the treatment, much manganese compounds may remain in the graphite particles whereby it is necessary to wash with an acid for a long time and, moreover, the capacity per gram of the active material is reduced. The temperature is preferably in the range of room temperature to 100° C.

In the case where the oxidizing treatment is conducted with the alkali or potassium permanganate, washing with an acid is preferably conducted because the residues after the oxidizing treatment are removed and, at the same time, the amorphous carbon can be more strongly and quickly adhered to the graphite particles resulting in a negative electrode active material having a high capacity. Examples of the acids used for washing are inorganic acids such as sulfuric acid, nitric acid, hydrochloric acid, phosphoric acid or hydrofluoric acid. Those acids may be used either solely or jointly. In addition, either diluted acid or a concentrated one may be used so far as the acid is capable of dissolving the residues after the oxidizing treatment.

Then the amorphous carbon is adhered on the surface of the oxidized graphite particles to give a negative electrode active material. Preferred examples of methods for adhering the amorphous carbon onto the surface of the oxidized graphite particles are a method in which the amorphous carbon is adhered by means of a gas-phase pyrolytic deposition of hydrocarbons; a method in which a carbon precursor is mixed with the graphite particles in a liquid phase followed by calcinating; and a method in which a carbon precursor which is carbonized in a solid phase is mixed with the graphite particles followed by calcinating although the present invention is not limited to the above-exemplified ones only. Among the above-mentioned adhering methods, a gas-phase pyrolytic deposition method is preferred because the amorphous carbon can be quickly deposited by said method.

It is preferred that the thickness of the amorphous carbon is 0.001–1 $\mu$m. The thickness range outside the above is not preferred because, when it is less than 0.001 $\mu$m, the area of the graphite particles which decomposes the electrolytic solution is not inactivated while, when it is more than 1 $\mu$m, the rate of the graphite particles which constitute the nuclei decreases whereby the capacity as a negative electrode is lowered. Incidentally, the term amorphous carbon used in the present invention means the carbon wherein the hexagonal net planes of the crystallites are irregularly layered as compared with the graphite particles, wherein microcrystals are accumulated or wherein the binding state is other than the sp2 hybrid orbit whereby the average lattice space as measured by an X-ray powder diffraction are larger than those of the graphite particles.

The negative electrode may be prepared by mixing the above-mentioned carbon material (a negative electrode active material) where the amorphous carbon is adhered on the surface of the graphite particles together with a binder. Examples of the applicable binders are a fluorinated polymer such as polyvinylidene fluoride and polytetrafluoroethylene; an olefinic polymer such as polyethylene and polypropylene; synthetic rubbers; and the like, which are usually used in the mixture or solution form using a solvent, although the present invention is not limited thereto.

It is preferred that the mixing ratio (by weight) of the carbon material to the binder is from 99:1 to 70:30. The ratio range outside the above is not preferred because, when the ratio by weight of the binder is more than 70:30, the internal resistance or polarization of the electrodes becomes larger to decrease the discharging capacity whereby the practical lithium secondary battery cannot be manufactured while, when it is less than 99:1, the binding ability of the negative electrode active material itself or of said material with the collector is not sufficient resulting in a detachment of the negative electrode substance and a decrease in the mechanical strength whereby the manufacture of the battery becomes difficult. It is preferred for improving the binding ability and also for removing the solvent of the binder in the manufacture of the negative electrode that the heating treatment is conducted in vacuo, in an inert gas or in an air at the temperature of not lower than the boiling point of the solvent and of around the melting point of the binder.

Collectors for the negative electrode may be made of copper, nickel or the like. In addition to a foil form, the collector may be also in a film form, sheet form, mesh form, punched form, lath form, porous form, foamed form or form of a molded article of fibers. The thickness of the collector which is usually used is from 1 $\mu$m to 1 mm although the present invention is not particularly limited thereto.

Examples of nonaqueous ionic conductors used in the present invention are organic electrolytic solutions, highmolecular solid electrolytes, inorganic solid electrolytes, fused salts. Among those, the organic electrolytic solutions can be preferably used.

It is preferred that, here, the solvent for the nonaqueous ionic conductor contains a mixed solvent comprising at least propylene carbonate (PC) and ethylene carbonate (EC) in a ratio (by volume) of from 9:1 to 1:9 and is optionally combined with other solvents. More preferred solvent is a mixed solvent of PC and EC in a ratio (by volume) of from 9:1 to 5:5 and other solvents if desired. The ratio range outside the above is not preferred because, when the amount of PC is more than the range of PC:EC=9.1, decomposition of the solvent takes place prior to others whereby such a solvent is not practical for use in the secondary batteries while, when the amount of PC is less than the range of PC:EC=1:9, the characteristics of the nonaqueous ionic conductor at −40° C. or lower are deteriorated whereby the secondary batteries do not work at low temperatures. Incidentally, the freezing point of PC is −48.8° C. while that of EC is 36.4° C. Therefore, it is preferred when the amount of EC is less than the range of PC:EC=5:5 (by volume) because the characteristics of the nonaqueous ionic conductor become closer to those of PC whereby the characteristic properties of the secondary batteries at low temperatures can be improved.

Here, the above-mentioned other optional solvents are those having a low viscosity and there is no particular limitation as to the mixing ratio of the above-mentioned mixed solvent to the lowly viscous solvents. The use of such lowly viscous solvents is preferred because, as compared with the sole use of a mixed solvent of PC with EC, the viscosity of the nonaqueous ionic conductor decreases and the conductivity of lithium ion becomes high.

Examples of such other solvents which may be optionally added to the nonaqueous ionic conductor are cyclic carbonates such as butylene carbonate; chain structure carbonates such as dimethyl carbonate, diethyl carbonate, ethyl methyl carbonate and dipropyl carbonate; lactones such as gamma-butyrolactone and gamma-valerolactone; furans such as tetrahydrofuran and 2-methyltetrahydrofuran; ethers such as diethyl ether, 1,2-dimethoxyethane, 1,2-diethoxyethane, ethoxymethoxyethane and dioxane; dimethyl sulfoxide; sulfolane; methylsulfolane; acetonitrile; methyl formate; methyl acetate. They may be used either solely or jointly. More preferred examples are chain structure carbonates such as dimethyl carbonate, diethyl carbonate, ethyl methyl carbonate and dipropyl carbonate and a particularly preferred example is ethyl methyl carbonate.

Examples of electrolytic salts for the nonaqueous ionic conductors are lithium salts including lithium perchlorate, lithium borofluoride, lithium hexafluorophosphate, lithium hexafluoroarsenate, lithium trifluoromethanesulfonate, lithium halides and lithium chloroaluminate. They may be used either solely or jointly.

The nonaqueous ionic conductor may be prepared by dissolving the electrolytic salt into the above-mentioned solvent. The solvents and the electrolytic salts which are used for preparing the nonaqueous ionic conductors are not limited to those which are listed hereinabove.

The positive electrode for the nonaqueous secondary battery of the present invention consists of a positive-electrode active material, a conductive material, a binder and, if necessary, a solid electrolyte.

It is preferred to use a lithium-containing chalcogenated compound as the positive electrode active material. When a lithium-containing transition metal chalcogenate is used, the battery is completed in a charged state and, therefore, that is preferred when the safety during the manufacturing stage is taken into consideration. It is also possible to use $MnO_2$, $MoO_3$, $V_2O_5$, $V_6O_{13}$ and the like as an oxide containing no lithium but that is not preferred since lithium is to be previously contained in a negative or positive electrode whereby the manufacturing steps become complicated. Examples of the lithium-containing chalcogenate applicable are a chalcogenate represented by the formula $Li_xM_{1-y}X_yO_2$ (in which M is any of Fe, Co and Ni; X is a transition metal or, preferably, a metal belonging to a group 4B or 5B of the periodic chart of the elements; $0<x\leq1$; and $0\leq y\leq1$). To be more specific, $LiCoO_2$, $LiNiO_2$, $LiFeO_2$, $LiMnO_2$ and the like may be exemplified. Additional applicable examples are a chalcogenate represented by the formula $LiMn_{2-z}X_zO_4$ (in which X is a transition metal or, preferably, a metal belonging to a group 4B or 5B of the periodic chart of the elements; and $0\leq z\leq 2$). To be more specific, $LiMn_2O_4$ and the like may be exemplified.

Examples of the conductive material applicable are carbons such as carbon black (acetylene black, thermal black, channel black, and the like), graphite powder, metal powder, although the present invention is not limited thereto.

Examples of the binder applicable are fluorinated polymers such as polytetrafluoroethylene and polyvinylidene fluoride; olefinic polymers such as polyethylene and polypropylene; synthetic rubber; and the like although the present invention is not limited thereto.

The mixing ratio of the conductive material and the binder to 100 parts by weight of the positive-electrode active material may be 5–50 parts of the conductive material and 1–30 parts by weight of the binder.

The ratio outside the above range is not preferred because, when the conductive material is less than 5 parts by weight or the binder is more than 30 parts by weight, the internal resistance or the polarization of the electrode becomes large and the discharging capacity of the electrode becomes lower whereby the practically usable lithium secondary battery cannot be prepared while, when the conductive material is more than 50 parts by weight, the relative amount of the active material contained in the electrode decreases and the discharging capacity as the positive electrode becomes lower and, when the binder is less than 1 part by weight, binding ability is lost and the manufacture of the battery becomes difficult due to a disintercalation of the active material and a lowering in the mechanical strength. When the binder is more than 30 parts by weight, that is not practical because, like in the case of the conductive material, the amount of the active material contained in the electrode decreases and, in addition, the internal resistance or polarization of the electrode becomes larger whereby the discharging capacity becomes low.

In the preparation of the positive electrode, it is preferred for improving the binding ability that a heating treatment is conducted at a temperature which is around melting point of each binder and is not lower than boiling point of the solvent.

Examples of materials to collectors applicable for the positive electrode are a metal alone or alloys. Specific examples are titanium, aluminum and stainless steel. Other examples are copper, aluminum and stainless steel wherein their surface is coated with titanium or silver as well as oxidized products thereof. The collector may be in a foil form, film form, sheet form, mesh form, punched form, lath form, porous form, foamed form, molded article of fibers. The thickness may be from 1 $\mu$m to 1 mm but there is no particular limitation thereto.

A separator is used for retaining the nonaqueous ionic conductive material. Examples of materials for the separator are nonwoven and woven fabrics of electrically insulating synthetic resin fibers, glass fibers, natural fibers, etc., molded products of powder of alumina, etc. and the like. Among those, nonwoven fabrics of synthetic resins such as polyethylene and polypropylene are particularly preferred in terms of the quality stability of the battery. Some of the above-mentioned unwoven synthetic resin fabrics have a function of shutting off the space between the positive and the negative electrodes as a result of fusion of the separator by heat when the battery is abnormally heated and, in terms of safety of the battery, separators of such a type may be preferably used. The thickness of the separator is not particularly limited so far as the separator is capable of retaining a necessary amount of the nonaqueous ionic conductive material and also of preventing the short circuit between the positive and the negative electrodes. Usually, the thickness may be around 0.01–1 mm and, preferably, around 0.02–0.05 mm.

When the constitution of the present invention is adopted, it is now possible that the graphite particles having a prominently uniform potential are used as the negative electrode active material for combining with the nonaqueous ionic conductive material mainly comprising propylene carbonate and having an excellent characteristic property at low temperature. Accordingly, the nonaqueous secondary batteries which have a highly uniform discharging potential of the battery and have an excellent property at low temperature can be now provided.

Moreover, as a result of the constitution of the present invention, the excellent characteristic property of the graphite particles to which the amorphous carbon is added is not deteriorated even when a powdering or kneading step is conducted in the manufacture of the battery whereby it is possible to reduce the cost for the manufacture of the materials.

EXAMPLES

The present invention will now be further illustrated by way of the following examples. Incidentally, a method for measuring the average lattice space ($d_{002}$) or crystallite sizes (Lc and La) by means of an X-ray wide angle diffraction may be conducted by known ones such as a method which is mentioned in "Tanso Zairyo Jikken Gijutsu (Experimental Methods of Carbon Materials), Vol. 1, pages 55–63, edited by Tanso Zairyo Gakkai (Association for Carbon Materials), published by Kagaku Gijutsusha". In the measurement of Lc and La, the shape factor (K) used was 0.9.

The specific surface area of the particles was measured by a BET method while the particle size was measured by a laser diffraction particle size distribution measuring apparatus and the peak of the particle size distribution was defined as an average particle size.

Example 1

Artificial graphite particles (flakes; particle size: 9 $\mu$m; $d_{002}$: 0.337 nm; Lc: 100 nm; La: 100 nm; specific surface area: 14 $m^2/g$) were used as graphite particles and, in accordance with a method as mentioned below, a carbon material in which amorphous carbon was adhered on the surface of the graphite particles was prepared.

The above-mentioned graphite powder (5 g) was placed on a plate for a sample in a box furnace and oxidized in an air at 600° C. for five hours. As a result thereof, the graphite powder weight became 4.9 g. Then 1 g of the oxidized graphite powder was placed on a plate 6 for a sample in an electric furnace as shown in FIG. 1, argon gas and propane gas were supplied into a quartz tube 5 using a carrier gas supplying line 1 and a material gas supplying line 2, respectively and then the needle valves 3 and 4 were operated to make the material gas concentration 5% by volume. The flow rate of the gas in the chamber was made 12 cm/minute. After that, the graphite powder was heated by a heating furnace 7 at 800° C. on the sample plate 6 and the propane gas supplied from a gas inlet 8 was thermally decomposed to deposit the amorphous carbon onto the surface of the graphite particles whereupon a negative electrode active material was prepared. Time for the deposition was three hours and the increasing rate in weight at that time was 11%. In FIG. 1, 9 means a gas outlet.

The negative electrode active material prepared as such was dispersed in a solution which was prepared by dissolving polyvinylidene fluoride (a binder) in N-methyl-2-pyrrolidone (a solvent) in a mortar to knead a paste of the negative electrode active material. The paste was coated on both sides of the collector made of copper foil, preliminarily dried in an air at 60° C. and dried in vacuo at 240° C. to prepare a negative electrode in a form of a sheet. This was further dried in vacuo at 200° C. to remove moisture therefrom and the product was used as a negative electrode. An apparent surface area and thickness of the resulting negative electrode were 8 $cm^2$ and 150 $\mu$m (including the thickness of the collector which was 50 $\mu$m), respectively.

A lead wire was electrically connected with the copper collector of the negative electrode for evaluating the single electrode. The evaluation was conducted using a three-electrode cell in a glove box under an atmosphere of argon where lithium was used as a counter electrode and a reference electrode. The nonaqueous ionic conductive material used here was a solution which was prepared by dissolving lithium perchlorate (an electrolytic salt) in a mixed solvent consisting of PC, EC and diethyl carbonate (DEC) to make the electrolyte salt concentration 1 mole/liter. The ratio by volume of a mixture of PC and EC to DEC was made 1:1 and an evaluation of the electrode was conducted using a solvent composition as shown in Table 1. The charge-discharge test was conducted in such a manner that a charge was carried out at the current density of 30 mA/g of the negative electrode active material to an extent of zero volt (to Li/Li$^+$) and then a discharge was carried out at the same current density until 2.5 volts. The results are given in Table 1 and in FIG. 2.

Comparative Example 1

The surface of the graphite particles (artificial graphite) used in Example 1 which were not subjected to an oxidizing treatment was deposited with the amorphous carbon under the same conditions as in Example 1 and the resulting negative electrode active material was subjected to an evaluation as a negative electrode by the same manner as in Example 1. An increase in weight after deposition of the carbon in that case was 9%. The results are shown in FIG. 2.

Figure 2:
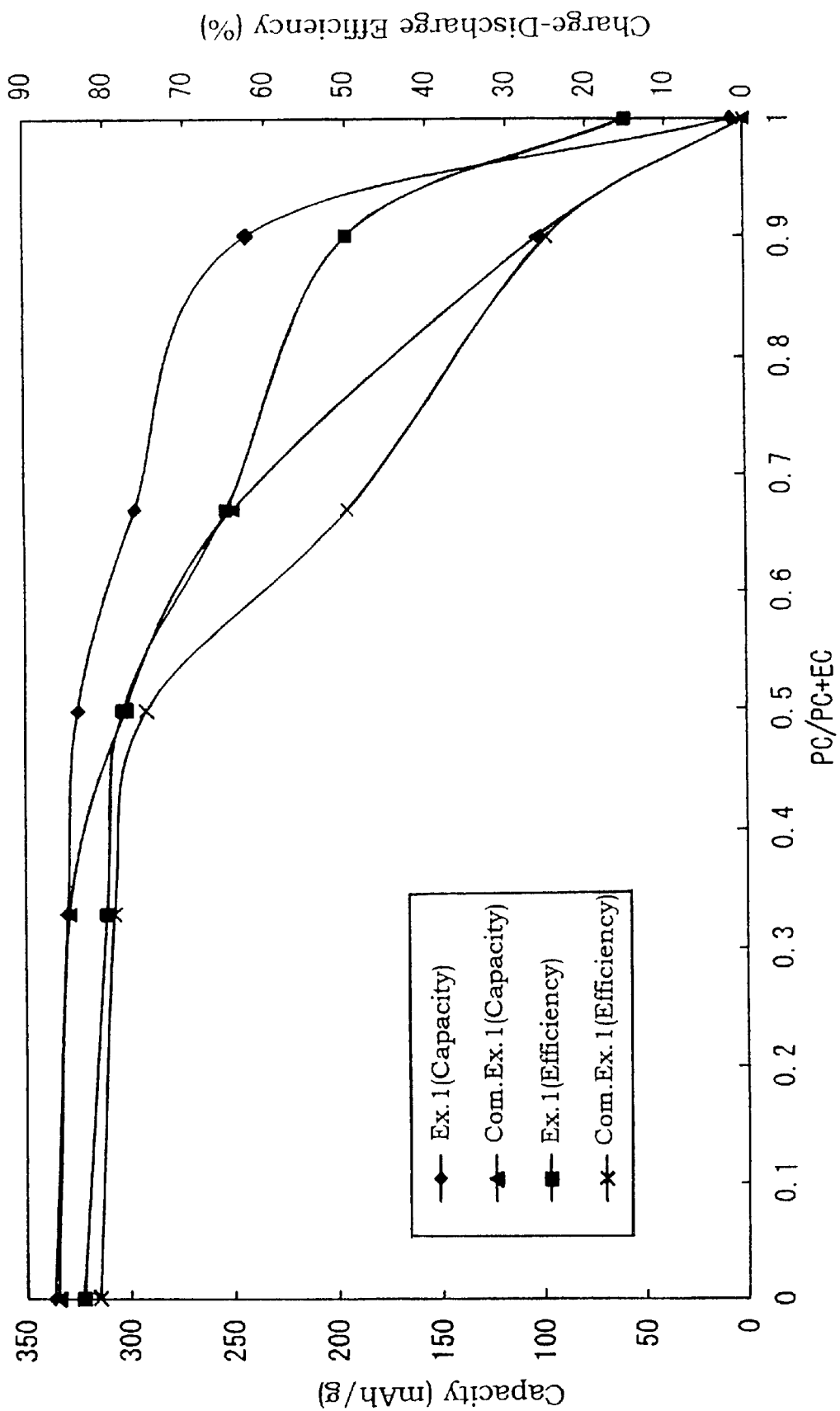
FIG. 2 is a graphical representation illustrating the discharging capacity, the initial charging-discharging efficiency and a ratio PC to PC+EC by volume in Example 1 and Comparative Example 1.

As shown in FIG. 2, a high charge-discharge capacity and a high initial charge-discharge efficiency were achieved when a graphite material wherein amorphous carbon was adhered on the surface of the oxidized graphite particles was used as a negative electrode active material and a mixed solvent containing at least PC and EC was used as a nonaqueous ionic conductor. This is believed to be due to an increase in an adhering strength of the graphite particles with the amorphous carbon. It is noted that such effects are remarkable especially when the EC is 0.5 or less in terms of the ratio by volume. It is also noted from the results of Example 1 and Comparative Example 1 that, when the amorphous carbon is adhered under the same conditions, the oxidized one gives more deposition and the depositing efficiency of the carbon is high as well.

Example 2

A negative electrode was manufactured by the same operations as in Example 1 except that natural graphite (made in Madagascar; flakes; particle size: 12 μm; $d_{002}$: 0.336 nm; Lc: 17 nm; La: 27 nm; specific surface area: 8 m$^2$/g) was used as a starting graphite particles, oxidizing temperature was 700° C. and the time required for the oxidation was 2.5 hours and was subjected to an evaluation. In this case, an increase in weight after deposition of the amorphous carbon was 70%. Incidentally, the nonaqueous ion conductor used here was prepared by dissolving lithium hexafluorophosphate (an electrolyte salt) in a 2:1:2 (by volume) mixture of PC, EC and dimethyl carbonate (DMC) to make the concentration of the electrolyte salt 1 mole/liter. The results are shown in Table 1.

Comparative Example 2

A negative electrode active material was prepared by depositing the amorphous carbon on the surface of the graphite particles (which was the same natural graphite [made in Madagascar] as used in Example 2 though unoxidized in this case) under the same conditions as in Example 1 and was subjected to an evaluation by the same manner as in Example 2. An increase in weight in this case after deposition of the amorphous carbon was 11%. The results are shown in Table 1.

Example 3

A negative electrode was manufactured and subjected to an evaluation by the same operations as in Example 1 except that an artificial graphite (flakes; particle size: 0.7 μm; $d_{002}$: 0.338 nm; Lc: 14 nm; La: 25 nm; specific surface area: 150 m$^2$/g) was used as a starting graphite particles. An increase in weight after deposition of the amorphous carbon in this case was 38%. Incidentally, the nonaqueous ion conductor used here was prepared by dissolving lithium borofluoride (an electrolyte salt) in a 2:1:5 (by volume) mixture of PC, EC and ethyl methyl carbonate (EMC) to make the concentration of the electrolyte salt 1 mole/liter. The results are shown in Table 1.

Comparative Example 3

A negative electrode active material was prepared by depositing the amorphous carbon on the surface of the graphite particles (which was the same artificial graphite as used in Example 3 although unoxidized in this case) under the same conditions as in Example 1 and was subjected to an evaluation by the same manner as in Example 3. An increase in weight in this case after deposition of the amorphous carbon was 29%. The results are shown in Table 1.

As shown in Table 1, it is possible to more strongly adhere the amorphous carbon on the surface of the particles even in the case of a highly crystalline natural graphite wherein the decomposition of the nonaqueous ion conductor is inhibited provided that it is oxidized at 700° C. It is also noted that, since the artificial graphite having a big specific surface area has a big contacting area with air, the amorphous carbon can be more strongly adhered on the surface of the graphite particles even by an oxidation treatment at 200° C.

Example 4

Artificial graphite was used as the starting graphite particles, oxidized under the same conditions as in Example 1, mixed with a coal tar pitch and the mixture was calcinated firstly at 300° C. for two hours in vacuo and then at 1,000° C. for three hours in an atmosphere of nitrogen. The resulting sample was taken out from an electric furnace, pulverized in a mortar, sieved to collect the particles of the uniform size and the resulting powder was subjected to the same operations as in Example 1 whereupon the negative electrode was prepared and subjected to an evaluation. The nonaqueous ion conductor used at that time was prepared by dissolving lithium perchlorate in a 1:1:2 (by volume) mixture of PC, EC and DEC to make the salt concentration 1 mole/liter. The results are shown in Table 1.

Comparative Example 4

A negative electrode active material was prepared by adhering the amorphous carbon on the surface of the graphite particles (which was the same artificial graphite as used in Example 4 although unoxidized in this case) under the same conditions as in Example 4 and was subjected to an evaluation by the same manner as in Example 4. The results are shown in Table 1.

As shown in Table 1, it is noted that, even when the amorphous carbon is deposited on the surface of the graphite particles in a liquid phase, the decomposition of the amorphous ion conductor is inhibited and, as a result of oxidizing the graphite, the adhering strength of the graphite particles with the amorphous carbon is improved.

Example 5

Artificial graphite used in Example 1 was used as the graphite particles and then the following method was conducted to manufacture a carbon material wherein the amorphous carbon was adhered on the surface of the graphite particles.

Thus, the above-mentioned graphite powder (5 g) was heated to reflux in 200 ml of 70% nitric acid at 110° C. for ten hours, washed with water and dried to give an oxidized graphite powder. There was no increase in weight after the treatment. Then this was calcinated using an electric furnace as shown in FIG. 1 wherein nitrogen gas and ethane gas were used as a carrier gas and a material gas, respectively. Concentration of the starting gas was made 3%. The reaction temperature and the depositing time were made 830° C. and 2.5 hours, respectively.

Manufacture of the electrode and evaluation of the single negative electrode were conducted by the same operations as in Example 2. The results are shown in Table 1.

Comparative Example 5

A negative electrode active material was prepared by adhering the amorphous carbon on the surface of the graphite particles (which were the same graphite particles as used in Example 1 although unoxidized in this case) under the same conditions as in Example 5 and was subjected to an evaluation by the same manner as in Example 5. The results are shown in Table 1.

Example 6

A negative electrode active material prepared by adhering the amorphous carbon on the surface of the graphite particles by the same manner as in Example 5 except that the concentration of nitric acid was 5% was used and an evaluation of the negative electrode was conducted by the same manner as in Example 5. Those results are shown in Table 1.

Example 7

Oxidized graphite powder was prepared by the same manner as in Example 5 except that, in oxidizing the graphite particles, fuming nitric acid (99% by weight of nitric acid) was used and the reaction temperature was 20° C.

The same operations as in Example 5 were conducted for adhering the amorphous carbon to the above-prepared graphite power and also for evaluating the single negative electrode. The results are shown in Table 1.

Example 8

The artificial graphite used in Example 1 was used as the graphite particles and a carbon material wherein amorphous carbon was adhered on the surface of the graphite particles was prepared by the following method.

Thus, the above graphite (5 g) was placed in a solution of 2.5 g of sodium nitrate in 120 ml of 98% sulfuric acid, potassium permanganate was added at not higher than 20° C., the mixture was kept at 35° C. for 30 minutes and then heated at 98° C. after adding 230 ml of water thereto, an excess of potassium permanganate was decomposed by hydrogen peroxide and, after that, washing with water was conducted sufficiently to give an oxidized graphite powder.

The same operations as in Example 5 were conducted for adhering the amorphous carbon to the surface of the above graphite powder and also for evaluating the single negative electrode. The results are shown in Table 1.

From the results of Examples 5–8 and Comparative Example 5, it is noted that, when the surface of the graphite particles is oxidized with nitric acid or inorganic mixed acid and potassium permanganate, the initial efficiency in an electrolytic solution system abundant in PC is improved and accordingly that an adhering strength between the graphite particles and the amorphous carbon is improved.

Example 9

The graphite particles used in Example 1 were oxidized by the following method.

First, 2 g of the graphite powder and 5 g of lithium hydroxide monohydrate were mixed in a mortar and heated in an air at 700° C. for two hours followed by well washing with water and drying to give an oxidized graphite powder.

The same operations as in Example 5 were conducted for adhering the amorphous carbon to the surface of the above graphite powder and also for evaluating the single negative electrode. The results are shown in Table 1.

Example 10

The graphite powder used in Example 1 was oxidized by the following method.

First, 60 g of the graphite powder was dispersed in 200 ml of a 1.5 N aqueous solution of sodium hydroxide, stirred at 60° C. for three hours, dried, heated in nitrogen at 300° C. for five hours, well washed with water and dried to give an oxidized graphite powder.

The same operations as in Example 5 were conducted for adhering the amorphous carbon to the surface of the above graphite powder and also for evaluating the single negative electrode. The results are shown in Table 1.

TABLE 1

| | Discharging Capacity (mAh/g) | Charge/Discharge Efficiency (%) | Increase in Weight (%) |
|---|---|---|---|
| Example 1 | 297 | 65 | 11 |
| Example 2 | 334 | 68 | 70 |
| Example 3 | 283 | 60 | 38 |
| Example 4 | 305 | 65 | 17 |
| Example 5 | 297 | 65 | 11 |
| Example 6 | 298 | 63 | 11 |
| Example 7 | 295 | 63 | 11 |
| Example 8 | 293 | 67 | 12 |
| Example 9 | 295 | 66 | 12 |
| Example 10 | 296 | 64 | 11 |
| Comparative Example 1 | 250 | 50 | 9 |
| Comparative Example 2 | 261 | 48 | 11 |
| Comparative Example 3 | 223 | 38 | 29 |
| Comparative Example 4 | 290 | 52 | 11 |
| Comparative Example 5 | 255 | 50 | 8 |

From the results of Examples 9 and 10, it is noted that, when the surface of the graphite particles is oxidized by heating with an alkali, the initial efficiency in an electrolytic solution system abundant in PC is improved and accordingly that a adhering strength between the graphite particles and the amorphous carbon is improved.

Example 11

An artificial graphite (flakes; particle size: 9 μm; $d_{002}$: 0.337 nm; Lc: 100 nm; La: 100 nm; specific surface area: 14 $m^2/g$) was used as graphite particles and then amorphous carbon was adhered on the surface of the graphite particles to prepare a carbon material according to the following method.

Thus, a solution prepared by dispersing 25 g of the artificial graphite in an aqueous solution of 0.06 mole/liter potassium permanganate was mixed with a solution of 0.1 mole/liter of sulfuric acid at 20° C. and the reaction was conducted by stirring at 50° C. for 25 hours. After that, 3 g of the graphite oxidized with potassium permanganate was placed in a mixed solution of nitric acid and hydrogen peroxide solution and washed with the acid by stirring at 25° C. for three hours. The graphite which was washed was filtered and well dried. It was confirmed at that time that no manganese compound was present in the graphite particles.

Then 1 g of the above-treated graphite powder was placed on a sample plate 6 of an electric furnace shown in FIG. 1. Argon gas and propane gas were supplied into a quartz tube 5 from a carrier gas supplying line 1 and a material gas supplying line 2, respectively and then needles valves 3 and 4 were operated so as to make the material gas concentration 5% by volume. The flow rate of the gas in the chamber was made 12 cm/minute. After that, the graphite powder on the sample plate 6 was heated by a heating furnace 7 and the propane gas supplied from the gas inlet 8 was thermally decomposed whereby carbon was deposited on the surface of the graphite particles to prepare a negative electrode active material. Time for the deposition was three hours and an increase in weight at that time was 14.7%. Incidentally, 9 in FIG. 9 shows a gas outlet.

The negative electrode active material prepared by the above-mentioned method was dispersed in a solution which was prepared by dissolving polyvinylidene fluoride (a binder) in N-methyl-2-pyrrolidone (a solvent) in a mortar and then kneaded to prepare a paste of the negative electrode active material. This paste was coated on both sides of the collector made of copper foil, preliminarily dried at 60° C. in an air and then dried in vacuo at 240° C. to prepare a negative electrode in a sheet form. This was further dried in vacuo at 200° C. for removing the moisture therefrom and the product was used as a negative electrode. An apparent surface area and an electrode thickness of the resulting negative electrode were 8 cm² and 150 μm (including the collector thickness of 50 μm), respectively.

A lead wire was electrically connected with the copper collector of the negative electrode for evaluating the single negative electrode. The evaluation was conducted using a three-electrode cell in a glove box under an atmosphere of argon where lithium was used in a counter electrode and a reference electrode. The nonaqueous ionic conductive material used here was a solution which was prepared by dissolving lithium perchlorate (an electrolytic salt) in a mixed solvent consisting of PC, EC and diethyl carbonate (DEC) to make the electrolytic salt concentration 1 mole/liter. The ratio by volume of a mixture of PC:EC:DEC was made 2:1:3 and an evaluation of the electrode was conducted. The charge-discharge test was conducted in such a manner that a charge was carried out at the current density of 30 mA/g of the active material to an extent of zero volt (to Li/Li$^+$) and, after a pause of 30 minutes, a discharge was carried out at the same current density until 2.5 volts. The results are given in Table 2.

Comparative Example 6

The surface of the graphite particles (artificial graphite) used in Example 11 which were not subjected to an oxidizing treatment was deposited with the carbon under the same conditions as in Example 11 and the resulting negative electrode active material was subjected to an evaluation as an electrode by the same manner as in Example 11. An increase in weight after deposition of the carbon in that case was 9%. The results are shown in Table 2.

Example 12

An electrode was manufactured and evaluated by the same manner as in Example 11 with an exception that no washing with acid was conducted. An increase in weight in this case after deposition of the carbon was 12%. The results are shown in Table 2. At that time, the presence of manganese compounds in the graphite particles was confirmed.

As shown in Table 2, when the graphite material prepared by adhering the amorphous carbon on the surface of the graphite particles which were oxidized with potassium permanganate was used as a negative electrode active material while a mixed solvent containing at least PC and EC was used as a nonaqueous ion conductor, then a high charge-discharge capacity and a high initial charge-discharge efficiency were achieved. This is believed to be due to an increase in the adhering strength between the graphite particles and the amorphous carbon.

It is also noted from the results of Example 11 and Comparative Example 6 that, when the amorphous carbon is adhered under the same conditions, the deposited amount is more in the case of being oxidized with potassium permanganate. It is therefore noted that the depositing efficiency is higher when an oxidizing treatment is conducted with potassium permanganate.

It is further noted from the results of Examples 11 and 12 that, when the amorphous carbon is adhered under the same conditions, the deposited amount is more in the case of being oxidized with potassium permanganate followed by washing with an acid. It is therefore noted that the depositing efficiency is higher when washing with an acid is conducted after the oxidizing treatment with potassium permanganate. It is furthermore noted that, when a treatment of washing with an acid is conducted, the capacity per weight further increases.

Example 13

The same operations as in Example 11 were conducted except that natural graphite (made in Madagascar; flakes; particle size: 12 μm; $d_{002}$: 0.336 nm; Lc: 17 nm; La: 27 nm; specific surface area: 7.5 m²/g) was used as the starting graphite particles, concentration of potassium permanganate was 0.13 mole/liter, treating temperature was 50° C., reaction temperature was two hours and the washing with acid after treating with potassium permanganate was conducted with sulfuric acid whereupon an electrode was manufactured and subjected to an evaluation. An increase in weight in that case after deposition of the carbon was 13%. Incidentally, the nonaqueous ion conductor used here was prepared by dissolving lithium hexafluorophoshate (an electrolytic salt) in a 2:2:1 (by volume) mixture of PC, EC and ethyl methyl carbonate (EMC) to make the concentration of the electrolytic salt 1 mole/liter. At that time, it was confirmed that no manganese compound was present in the graphite particles. The results are shown in Table 2.

Comparative Example 7

The surface of the natural graphite (made in Madagascar) used in Example 13 which were not subjected to an oxidizing treatment was deposited with the amorphous carbon under the same conditions as in Example 11 and the resulting negative electrode active material was subjected to an evaluation as an electrode by the same manner as in Example 13. An increase in weight after deposition of the carbon in that case was 11%. The results are shown in Table 2.

Example 14

The same operations as in Example 11 were conducted except that spherical graphite (particle size: 6 μm; $d_{002}$: 0.337 nm; Lc: 13 nm; La: 11 nm; specific surface area: 8 m²/g) was used as the starting graphite particles, concentration of potassium permanganate was 0.06 mole/liter, treating temperature was 50° C., reaction time was 25 hours and the washing with acid after treating with potassium permanganate was conducted with sulfuric acid whereupon an electrode was manufactured and subjected to an evaluation. An increase in weight in that case after deposition of the carbon was 18%. Incidentally, the electrolytic solution used here was prepared by dissolving lithium borofluoride (an electrolytic salt) in a 3:1:4 (by volume) mixture of PC, EC and dimethyl carbonate (DMC) to make the concentration of the electrolytic salt 1 mole/liter. At that time, it was confirmed that no manganese compound was present in the graphite particles. The results are shown in Table 2.

Comparative Example 8

The surface of the spherical graphite used in Example 13 which was not subjected to an oxidizing treatment was deposited with the amorphous carbon under the same conditions as in Example 11 and the resulting negative electrode active material was subjected to an evaluation as an electrode by the same manner as in Example 14. An increase in weight after deposition of the carbon in that case was 10%. The results are shown in Table 2.

As shown in Table 2, when the graphite material prepared by adhering the amorphous carbon on the surface of the graphite particles which were oxidized with potassium permanganate was used as a negative electrode active material, it is noted that a charge-discharge is possible even in a system containing PC and, moreover, a high charge-discharge capacity and a high initial charge-discharge efficiency are achieved independently of the shape of the graphite even in a system containing much PC. This is believed to be due to an increase in the adhering strength between the graphite particles and the amorphous carbon whereby a high capacity and a high charge-discharge efficiency are achieved.

Example 15

The artificial graphite used in Example 11 was used as a starting graphite, subjected to the same oxidizing treatment with potassium permanganate under the same conditions as in Example 11 and mixed with coal tar pitch and the mixture was calcinated at 300° C. in an atmosphere of nitrogen for two hours and then at 1,000° C. for three hours. The resulting sample was taken out from the electric furnace, pulverized in a mortar, sieved to collect the particles of the uniform diameters and then an electrode was manufactured from the resulting powder and subjected to an evaluation by the same manners as in Example 11. The electrolytic solution used here was prepared by dissolving lithium perchlorate in a 1:1:2 (by volume) mixture of PC, EC and DEC to make the salt concentration 1 mole/liter. At that time, it was confirmed that no manganese compound was present in the graphite particles. The results are shown in Table 2.

Comparative Example 9

The surface of the artificial graphite used in Example 15 which was not subjected to an oxidizing treatment was deposited with the amorphous carbon under the same conditions as in Example 5 and the resulting negative electrode active material was subjected to an evaluation as an electrode by the same manner as in Example 15. The results are shown in Table 2.

As shown in Table 2, it is noted that, when amorphous carbon is adhered by means of a liquid-phase method on the surface of the graphite particles which were oxidized with potassium permanganate, the discharge capacity and the initial charge-discharge efficiency are improved.

TABLE 2

| | Discharge Capacity (mAh/g) | Efficiency (%) | Deposited Carbon (%) | Electrolytic Solution |
|---|---|---|---|---|
| Example 11 | 346.2 | 76.9 | 14.7 | PC:EC:DEC = 2:1:3 |
| Comp. Ex. 6 | 250 | 50 | 9 | PC:EC:DEC = 2:1:3 |
| Example 12 | 309.5 | 62.8 | 12 | PC:EC:DEC = 2:1:3 |
| Example 13 | 305.4 | 64 | 13 | PC:EC:EMC = 2:2:1 |
| Comp. Ex. 7 | 270 | 53.2 | 11 | PC:EC:EMC = 2:2:1 |
| Example 14 | 280.8 | 58.8 | 18 | PC:EC:DMC = 3:1:4 |
| Comp. Ex. 8 | 244 | 44.2 | 10 | PC:EC:DMC = 3:1:4 |
| Example 15 | 310 | 63.2 | — | PC:EC:DEC = 1:1:2 |
| Comp. Ex. 9 | 290 | 55 | — | PC:ED:DEC = 1:1:2 |

Example 16

Figure 3:
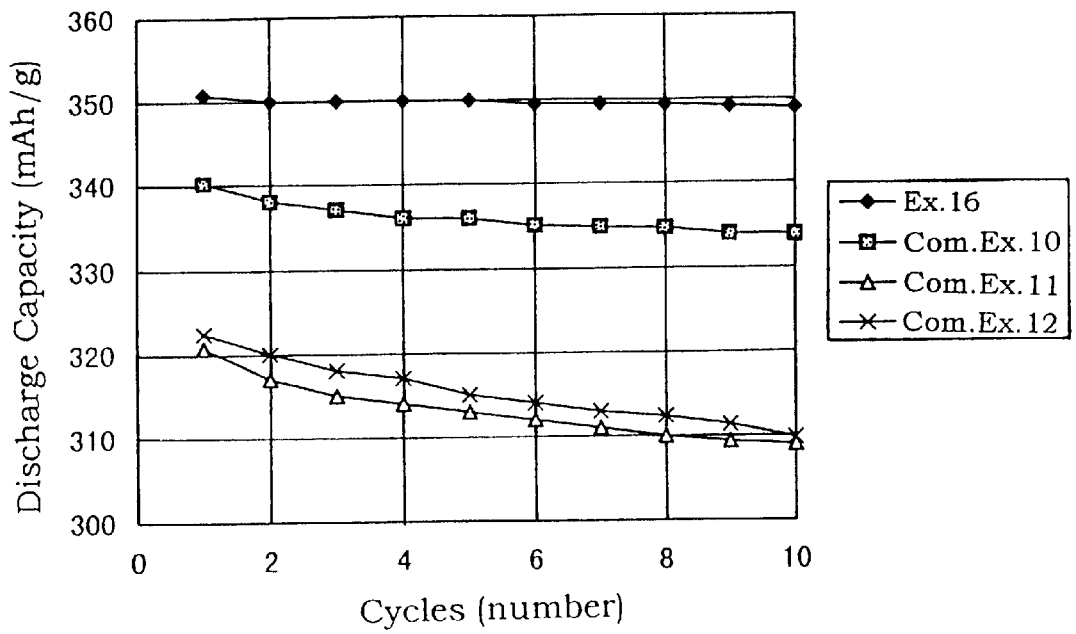
FIG. 3 is a graphical representation illustrating the cyclic characteristics in Example 16 and Comparative Examples 10–12.

The same operations as in Example 11 were conducted except that artificial graphite (flakes; particle size: 12 μm; $d_{002}$: 0.337 nm; Lc: 20 nm; La: 50 nm; specific surface area: 8 m$^2$/g) was used as the starting graphite particles, concentration of potassium permanganate was 0.3 mole/liter, treating temperature was 50° C., reaction time was five hours and the washing with acid after treating with potassium permanganate was conducted with sulfuric acid whereupon an electrode was manufactured. Evaluation of the electrode was conducted by the same manner as in Example 11. An increase in weight in that case after deposition of the carbon was 14%. Incidentally, the electrolytic solution used here was prepared by dissolving lithium hexafluorophoshate (an electrolytic salt) in a 1:2:3 (by volume) mixture of PC, EC and EMC to make the concentration of the electrolytic salt 1 mole/liter. At that time, it was confirmed that no manganese compound was present in the graphite particles. The results are shown in Table 3. The cycle characteristics at 25° C. are shown in FIG. 3.

In addition, the particle size distributions of the graphite particles measured without irradiation of the ultrasonic wave in water and measured with irradiation of it for three hours are shown as well.

Comparative Example 10

The surface of the graphite particles used in Example 16 which were not subjected to an oxidizing treatment was deposited with the amorphous carbon under the same conditions as in Example 16 and the resulting negative electrode active material was subjected to an evaluation as an electrode by the same manner as in Example 16. An increase in weight after deposition of the carbon in that case was 10%. The results are shown in Table 3 and FIG. 3.

Comparative Example 11

The surface of the artificial graphite used in Example 16 which was subjected to an oxidizing treatment by potassium permanganate under the same conditions as in Example 16 was deposited with the amorphous carbon under the same conditions as in Example 16 and the resulting negative electrode active material was subjected to an evaluation as an electrode by the same manner as in Example 16. The results are shown in Table 3 and FIG. 3.

Comparative Example 12

The artificial graphite used in Example 16 was used as a starting graphite, subjected to the same oxidizing treatment with potassium permanganate under the same conditions as in Example 16 and mixed with coal tar and the mixture of coal tar and graphite was calcinated at 400° C. in an atmosphere of nitrogen for five hours and then at 1,000° C. for three hours. The resulting sample was taken out from the electric furnace, pulverized in a mortar, sieved to collect the powder of the uniform diameters and an electrode was manufactured from the resulting powder by the same operations as in Example 16 and subjected to an evaluation by the same operations as in Example 16. The results are shown in Table 3 and FIG. 3.

TABLE 3

| | Discharge Capacity (mAh/g) | Efficiency (%) | Deposited Carbon (%) | Ultrasonic Operation (μm) | |
|---|---|---|---|---|---|
| | | | | Before | After |
| Example 16 | 350.8 | 82.8 | 14 | 12 | 11.6 |
| Comp. Ex. 10 | 340.2 | 79.5 | 10 | 11 | 10.1 |
| Comp. Ex. 11 | 320.7 | 78.8 | — | 12.5 | 8.2 |
| Comp. Ex. 12 | 322.4 | 78.4 | — | 11.8 | 8.4 |

It is noted from the results of measurements of the particle size distribution that, when the amorphous carbon was adhered to the surface of the graphite particles in a gas-phase method, there was nearly no change in the particle size between the stages of before and after irradiation of the ultrasonic wave. When a liquid-phase method was used, however, the particle size became small upon irradiation of the ultrasonic wave. From those results, it is noted that, when a gas-phase method is used, the amorphous carbon and the graphite particles are able to be more strongly adhered whereby the discharge capacity and the charge-discharge efficiency are improved.

It is also noted as shown in FIG. 3 that, when the adhesive force between the amorphous carbon and the graphite particles are strong, peeling-off of the negative electrode active material does not take place whereby the cycle characteristics of the battery are excellent.

Example 17

(Preparation of Negative Electrode)

A negative electrode active material wherein the surface was adhered with an amorphous carbon was prepared by the same method as in Example 1, a dispersing agent of a nonionic type was added thereto, a dispersion of polytetrafluoroethylene was added (the ratio by weight of the negative electrode active material to polytetrafluoroethylene after drying=91:9) and the mixture was made into a paste in a mortar and applied into the pores of the nickel three-dimensional porous collector. This was preliminarily dried at 60° C., subjected to a thermal treatment at 240° C., pressed and dried in vacuo for removing the moisture therefrom to give a negative electrode. The resulting negative electrode was in a tablet form having a diameter of 14.5 mm and an electrode thickness of 0.41 mm.

(Preparation of Positive Electrode)

Each of lithium carbonate, cobalt carbonate and antimony trioxide was weighed to make the atomic ratio of lithium::cobalt:antimony 1:9.95:0.05. They were mixed in a mortar, calcinated in an air at 900° C. for 20 hours and pulverized in a mortar to give a positive electrode active material powder. This active material had a composition of $Li_{0.98}Co_{0.95}Sb_{0.05}O_2$. The positive electrode active material prepared as such was mixed with acetylene black, a dispersing agent of a nonionic type was added thereto, then a dispersion of polytetrafluoroethylene was added (the ratio by weight of the positive electrode active material:acetylene black:polytetrafluoroethylene after drying was 100:10:5) and the resulting paste was coated on a titanium mesh collector. This was preliminarily dried at 60° C., subjected to a thermal treatment at 240° C., pressed and dried in vacuo at 200° C. for removing the moisture therefrom to give a positive electrode. This positive electrode was in a tablet form having a diameter of 15 mm and a thickness of 0.9 mm.

(Fabrication of Battery)

Figure 4:
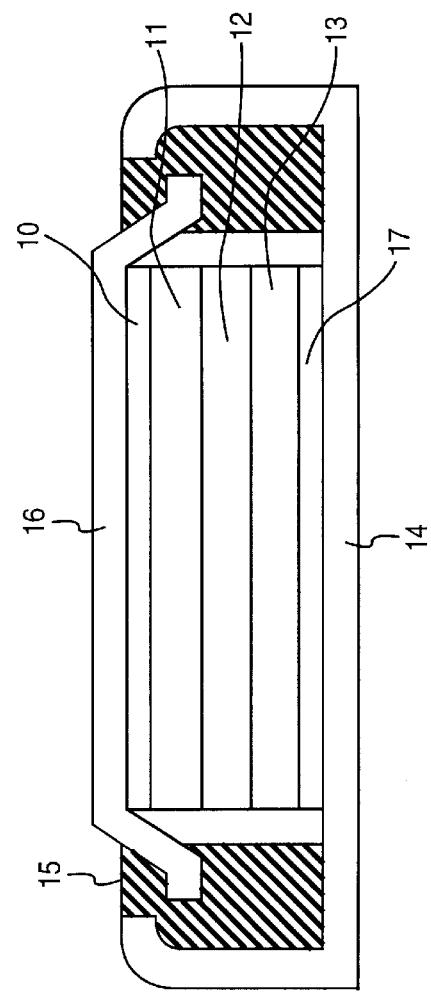
FIG. 4 is a schematic diagram illustrating a coin-type battery of the present invention.

As shown in FIG. 4, a positive electrode 13 was press-fitted to a positive electrode case 17 wherein the positive electrode collector 14 was press-molded to the inner bottom and a seal packing 15 was installed. After that, a separator 12 made of nonwoven polypropylene fabric was placed thereupon and impregnated with a nonaqueous ion conductor prepared by dissolving 1 mole/liter of $LiPF_6$ (an electrolytic salt) in a 1:1:2 (by volume) mixture of PC, EC and DEC. In the meanwhile, a negative electrode collector 10 was press-molded to the inner surface of the negative electrode cover 16 and then a negative electrode 11 was press-fitted to the negative electrode collector. After that, said negative electrode 11 was placed on the above-mentioned separator 12 and then the positive electrode case 17 and the negative electrode cover 16 were caulked together via a seal packing 15 to fabricate a coin-type battery.

(Evaluation of Battery)

Charge-discharge current and upper-limit charge voltage of the coin-type battery fabricated as such were made 1 mA and 4.2 volts, respectively and then charged at a constant-voltage of 4.2 volts where the charge time was made 12 hours. A charge-discharge test was conducted after making the lower-limit discharge voltage 2.5 volts. The temperature-dependency of the capacity of the resulting battery was measured and the results are shown in Table 4.

Example 18

A negative electrode was prepared by the same method as mentioned in Example 17 except that the carbon material of Example 5 was used as a negative electrode active material. Both size and thickness of the prepared negative electrode were made as same as those mentioned in Example 17. Method for preparing the positive electrode and method for fabricating the battery were the same as those mentioned in Example 17 as well.

The fabricated battery was evaluated by the same method as mentioned in Example 17. The results are shown in Table 4.

Example 19

A negative electrode was prepared by the same method as mentioned in Example 17 except that the carbon material of Example 9 was used as a negative electrode active material. Both size and thickness of the prepared negative electrode were made as same as those mentioned in Example 17. Method for preparing the positive electrode and method for fabricating the battery were the same as those mentioned in Example 17 as well.

The fabricated battery was evaluated by the same method as mentioned in Example 17. The results are shown in Table 4.

Comparative Example 13

A negative electrode was prepared by the same method as mentioned in Example 17 except that the carbon material of Comparative Example 1 was used as a negative electrode active material. Both size and thickness of the prepared negative electrode were made as same as those mentioned in Example 17. Method for preparing the positive electrode and method for fabricating the battery were the same as those mentioned in Example 17 as well.

The fabricated battery was evaluated by the method mentioned in Example 17. The results are shown in Table 4.

TABLE 4

| Measuring Temperature | Examples | | | Comp. Ex. |
| --- | --- | --- | --- | --- |
| (° C.) | 17 | 18 | 19 | 13 |
| 40 | 17 | 17 | 17 | 17 (mAh) |
| 25 | 16 | 15 | 15 | 15 (mAh) |
| 0 | 11 | 9 | 9 | 7 (mAh) |
| −25 | 5 | 4 | 4 | 0 (mAh) |
| 25 (after 100 cycles) | 15 | 14 | 15 | 12 (mAh) |
| 25 (after 200 cycles) | 15 | 13 | 14 | 9 (mAh) |

It is noted as shown in Table 4 that, as a result of oxidation of the graphite particles, an adhesive strength between the graphite particles and the amorphous carbon on the surface was improved and that a secondary battery having an excellent property even at low temperatures was able to be fabricated.

Example 20

(Preparation of Negative Electrode)

A negative electrode active material wherein the surface was adhered with an amorphous carbon was prepared by the same method as in Example 11, dispersed in a solution which were prepared by dissolving polyvinylidene fluoride (a binder) in N-methyl-2-pyrrolidone (a solvent) in a mortar and the resulting paste was placed into the pores of a nickel three-dimensional porous collector. This was preliminarily dried at 60° C., subjected to a thermal treatment at 240° C., pressed and dried in vacuo for removing the moisture therefrom to give a negative electrode. The resulting negative electrode was in a tablet form having a diameter of 15 mm and an electrode thickness of 0.50 mm.

(Preparation of Positive Electrode)

Each of lithium hydroxide and nickel hydroxide was weighed to make the atomic ratio of lithium:nickel 1:2. They were mixed in a mortar, calcinated in an oxygen stream at 700° C. for 20 hours and pulverized in a mortar to give $LiNiO_2$ which was a positive electrode active material powder. The positive electrode active material prepared as such was mixed with acetylene black, dispersed in a solution which was prepared by dissolving polyvinylidene fluoride (a binder) in N-methyl-2-pyrrolidone (a solvent) in a mortar and the resulting paste was coated on an aluminum foil collector. This was preliminarily dried at 60° C., subjected to a thermal treatment at 240° C., pressed and dried in vacuo at 200° C. for removing the moisture therefrom to give a positive electrode. This positive electrode was in a tablet form having a diameter of 14.8 mm and a thickness of 0.90 mm.

(Fabrication of Battery)

As shown in FIG. 4, a positive electrode 13 was press-fitted to a positive electrode case 17 wherein the positive electrode collector 14 was press-molded to the inner bottom and an insulation packing 15 was installed. After that, a separator 12 made of nonwoven polypropylene fabric was placed thereupon and impregnated with a nonaqueous ion conductor prepared by dissolving 1 mole/liter of $LiPF_6$ (an electrolytic salt) in a 2:1:3 (by volume) mixture of PC, EC and EMC. In the meanwhile, a negative electrode collector 10 was press-molded to the inner surface of the negative electrode cover 16 and then a negative electrode 11 was press-fitted to the negative electrode collector.

Then said negative electrode 11 was placed on the above-mentioned separator 12 and then the positive electrode case 17 and the negative electrode cover 16 were caulked together via an insulation packing 15 to fabricate a coin-type battery.

(Evaluation of Battery)

Charge-discharge current and upper-limit charge voltage of the coin-type battery fabricated as such were made 1 mA and 4.2 volts, respectively and then charged at a constant-voltage of 4.2 volts where the charge time was made 12 hours. A charge-discharge test was conducted after making the lower-limit discharge voltage 2.5 volts. The temperature-dependency of the capacity of the resulting battery was measured. The charge-discharge test was conducted in a thermostat which was kept at 40° C., 25° C., 0° C. and −20° C. The results are shown in Table 5. Moreover, the results of the cycle test conducted at 0 are ° C. shown in FIG. 5.

Comparative Example 14

A negative electrode was prepared by the same method as mentioned in Example 20 except that the carbon material of Comparative Example 6 was used as a negative electrode active material. Both size and thickness of the prepared negative electrode were made the same as those mentioned in Example 20. Method for preparing the positive electrode and method for fabricating the battery were the same as those mentioned in Example 20 as well.

The resulting battery was evaluated by a method mentioned in Example 20. The results are shown in Table 5 and FIG. 5.

Comparative Example 15

A battery was manufactured and an evaluation of the battery was conducted by the same manner as in Example 20 except that a 2:1:3 (by volume) mixture of PC, EC and DEC was used as the nonaqueous ion conductor. The results are shown in Table 5 and FIG. 5.

TABLE 5

| Temperature | Example 20 | Comp. Ex. 14 | Comp. Ex. 15 |
| --- | --- | --- | --- |
| 40° C. | 16 | 15 | 16 |
| 25° C. | 14 | 12 | 14 |
| 0° C. | 10 | 8 | 8 |
| −20° C. | 6 | 1 | 4 |

It is noted as shown in Table 5 that, as a result of oxidation of the graphite particles with potassium permanganate, an adhesive strength between the graphite particles and the lowly crystalline carbon on the surface was improved and that a secondary battery having an excellent property even at low temperatures was able to be fabricated.

Figure 5:
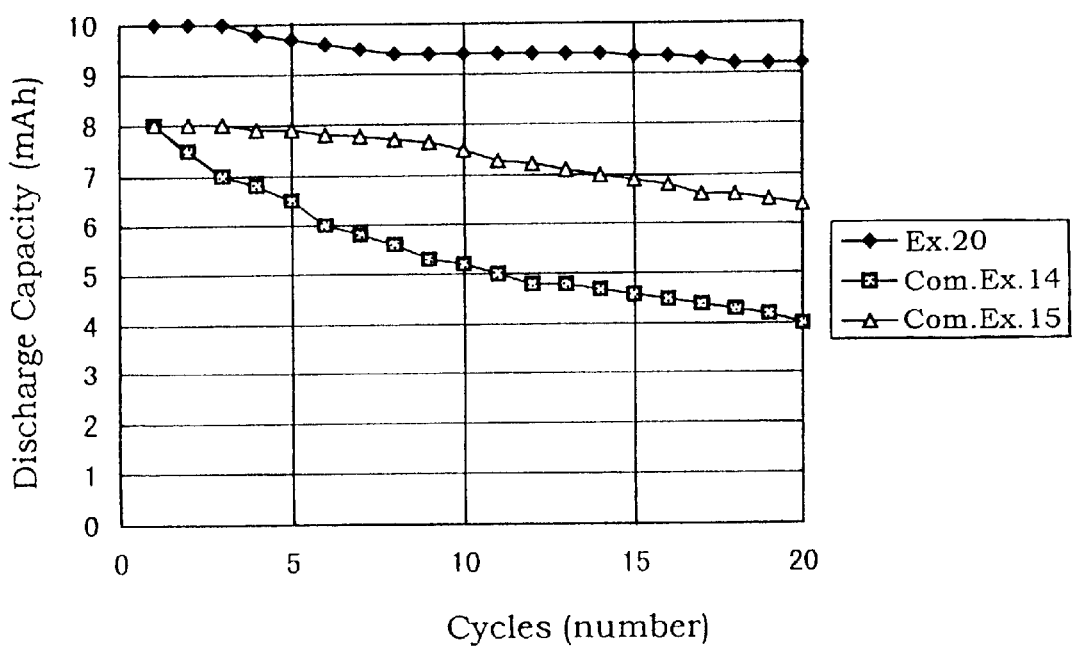
FIG. 5 is a graphical representation illustrating the cyclic characteristics of the coin-type batteries in Example 20 and Comparative Examples 14 and 15.

As shown in FIG. 5, the graphite particles which were subjected to an oxidizing treatment with potassium permanganate had good cycle characteristics at low temperatures whereby it is noted that an oxidizing treatment of the graphite particles with potassium permanganate gave rise to an improvement in an adhesion strength between the graphite particles with the amorphous carbon on the surface.

It is further noted that, when a comparison was made in terms of the lowly viscous solvent, an excellent cycle property was resulted by the use of EMC than that of DEC.

The nonaqueous secondary battery of the present invention consists of a negative electrode, a positive electrode in which a chalcogenated substance containing lithium is used as a positive electrode active material, and a nonaqueous ion conductor; and said negative electrode contains a negative electrode active material which is a carbon material where an amorphous carbon is adhered on the surface of the oxidized graphite particles.

Consequently, when the graphite particles are oxidized prior to adhesion of the amorphous carbon, an adhesive strength between the amorphous carbon and the graphite particles can be improved and, in addition, the time for depositing the amorphous carbon can be shortened and the manufacturing cost can be reduced in a gas-phase pyrolytic deposition method.

Furthermore, when a nonaqueous ion conductor mainly comprising propylene carbonate having excellent characteristics at low temperature and a carbon material of a graphite type having an excellent uniformity of potential and excellent characteristics at low temperature are jointly used, it is now possible to manufacture a secondary battery which has a high capacity, a high uniformity of potential and excellent characteristics at low temperature.

What is claimed is:

1. A nonaqueous secondary battery comprising a negative electrode, a positive electrode in which a chalcogenated substance containing lithium is used as a positive electrode active material and a nonaqueous ion conductor, said negative electrode containing a negative electrode active material which is a carbon material where an amorphous carbon is adhered on the surface of oxidized graphite particles.

2. A nonaqueous secondary battery according to claim 1 in which the graphite particles have been oxidized by an oxidizing treatment with an aqueous solution of potassium permanganate in a concentration of 0.01~1 mole/liter at a temperature from room temperature to 100° C., optionally followed by an acid washing and drying.

3. A nonaqueous secondary battery according to claim 1 in which the graphite particles have been oxidized by an oxidizing treatment with an aqueous solution of nitric acid in a concentration of 5~99% by weight at a temperature from 20° C. to 130° C.

4. A nonaqueous secondary battery according to claim 1 in which the graphite particles have been oxidized by an oxidizing treatment in air at a temperature form 500° C. to 700° C.

5. A nonaqueous secondary battery according to claim 1 in which the graphite particles have been oxidized by an oxidizing treatment with an alkali salt in solid state in air at a temperature from 300° C. to 700° C., optionally followed by an acid washing and drying.

6. A nonaqueous secondary battery according to claim 1 in which the graphite particles have been dispersed in an alkali solution, dried and subjected to an oxidizing treatment in air at a temperature from 300° C. to 700° C., optionally followed by an acid washing and drying.

7. A nonaqueous secondary battery according to claim 1 in which the graphite particles prior to being oxidized have the properties that an average lattice spacing ($d_{002}$) of the plane (002) by an X-ray wide angle diffraction is 0.335–0.340 nm, a crystallite thickness (Lc) in the direction of the plane (002) is not less than 10 nm, and the crystallite thickness (La) in the direction of the plane (110) is not less than 10 nm.

8. A nonaqueous secondary battery according to claim 1 in which the graphite particles prior to being oxidized have a specific surface area of 5–150 m$^2$/g as measured by a BET method and an average particle size of 0.7–80 $\mu$m.

9. A nonaqueous secondary battery according to claim 1 in which the nonaqueous ionic conductor comprises a mixed solvent which at least contains propylene carbonate and ethylene carbonate.

10. A nonaqueous secondary battery according to claim 9 in which the ratio of propylene carbonate to ethylene carbonate by volume is from 9:1 to 1:9.

11. A nonaqueous secondary battery according to claim 10 in which the ratio of propylene carbonate to ethylene carbonate by volume is from 9:1 to 5:5.

12. A nonaqueous secondary battery according to claim 1 in which the chalcogenated substance is a metal oxide containing lithium.

13. A nonaqueous secondary battery according to claim 12 in which the metal oxide containing lithium is $Li_xM_{1-y}X_yO_2$ (in the formula, M is Fe, Co or Ni; X is a transition metal; $0<x\leq1$; and $0\leq y\leq1$) or $LiMn_{2-z}X_zO_4$ (in the formula, X is a transition metal; and $0\leq z\leq2$).

14. A nonaqueous secondary battery according to claim 13 in which the metal oxide containing lithium is $LiCoO_2$, $LiNiO_2$, $LiFeO_2$, $LiMnO_2$ or $LiMn_2O_4$.

15. A method of manufacturing a negative electrode active material comprising the steps of oxidizing graphite particles and adhering amorphous carbon on the surface of the graphite particles to form a negative electrode active material.

16. A manufacturing method according to claim 15 in which the oxidizing step is conducted in air at 500–700° C.

17. A manufacturing method according to claim 15 in which the oxidizing step is conducted at 300–700° C. in air after the graphite particles are mixed with an alkali salt in solid state, or the graphite particles are dispersed in an alkali solution and dried.

18. A manufacturing method according to claim 15 in which the oxidizing step is conducted by using an aqueous solution of potassium permanganate in a concentration of 0.01~1 mole/liter at a temperature from room temperature to 100° C.

19. A manufacturing method according to claim 15 in which the oxidizing step is conducted by using nitric acid having a concentration of 5–99% by weight at a temperature of 20–130° C.

20. A manufacturing method according to claim 15 in which the amorphous carbon is adhered on the surface of the graphite particles by means of a gas-phase pyrolysis of hydrocarbon.

21. A manufacturing method according to claim 15 in which the graphite particles are washed with an acid after the oxidizing step by using the alkali salt in solid state, alkali solution or potassium permanganate and before the adhesion of the amorphous carbon on the surface of the graphite particles.

22. A manufacturing method according to claim 21 in which the washing with an acid is conducted at least by one acid selected from sulfuric acid, nitric acid, hydrochloric acid, phosphoric acid, hydrofluoric acid and hydrogen peroxide.

* * * * *